United States Patent
Takenaka et al.

(10) Patent No.: US 7,576,152 B2
(45) Date of Patent: Aug. 18, 2009

(54) ADDITIVE FOR POLYESTER BASE SYNTHETIC RESIN CONTAINING PLASTICIZER AND PLASTICIZER FOR BIODEGRADABLE RESIN

(75) Inventors: Akira Takenaka, Wakayama (JP); Masaaki Tuchihashi, Wakayama (JP)

(73) Assignee: Kao Corporation, Tokyo (JP)

( * ) Notice: Subject to any disclaimer, the term of this patent is extended or adjusted under 35 U.S.C. 154(b) by 351 days.

(21) Appl. No.: 10/703,625

(22) Filed: Nov. 10, 2003

(65) Prior Publication Data

US 2004/0152810 A1 Aug. 5, 2004

(30) Foreign Application Priority Data

Nov. 12, 2002 (JP) ............................. 2002-327894
Jan. 14, 2003 (JP) ............................. 2003-005414

(51) Int. Cl.
  *C08K 5/20* (2006.01)
  *C08G 63/06* (2006.01)
  *C08K 5/109* (2006.01)
  *C08K 5/435* (2006.01)

(52) U.S. Cl. ................... 524/223; 524/168; 524/221; 524/241; 524/280; 524/599

(58) Field of Classification Search ................ 524/241, 524/242, 221, 223
See application file for complete search history.

(56) References Cited

U.S. PATENT DOCUMENTS 5,502,158 A  3/1996  Sinclair et al.

6,194,061 B1 *  2/2001  Satoh et al. ................... 428/341
2002/0150775 A1 *  10/2002  Ishikawa et al. ............ 428/458

FOREIGN PATENT DOCUMENTS

| EP | 0455370 A2 | 11/1991 |
|---|---|---|
| EP | 0814092 A1 | 12/1997 |
| JP | 4-4652 B2 | 1/1992 |
| JP | 5-86277 A | 4/1993 |
| JP | 06299054 A * | 10/1994 |
| JP | 8-301994 A | 11/1996 |
| JP | 2601737 B2 | 1/1997 |
| JP | 9-31308 A | 2/1997 |
| JP | 9-95605 A | 4/1997 |
| JP | 9-278991 A | 10/1997 |
| JP | 2000-302956 A | 10/2000 |
| JP | 2002-146170 A | 5/2002 |
| JP | 2003-55470 A | 2/2003 |

OTHER PUBLICATIONS

Machine translation of JP 09-095605, Apr. 8, 1997.*
Machine Translation and Abstract of JP 06-299054 (Oct. 25, 1994).*
English language translation of JP 09095605 (Apr. 8, 1997).

* cited by examiner

*Primary Examiner*—Vickey Nerangis
(74) *Attorney, Agent, or Firm*—Birch, Stewart, Kolasch & Birch, LLP

(57) ABSTRACT

An additive to a polyester base synthetic resin containing a plasticizer that contains at least one compound selected from hydroxy aliphatic monocarboxylic acid ester and carboxylic acid amide is provided. In addition, a polyester base synthetic resin composition containing a polyester-base synthetic resin, a plasticizer, and at least one compound selected from hydroxy aliphatic monocarboxylic acid ester and carboxylic acid amide are also provided. Further, a plasticizer for biodegradable resins that can impart flexibility without disturbing the transparency of the biodegradable resins is provided. A biodegradable composition contains the plasticizer.

2 Claims, 1 Drawing Sheet

ADDITIVE FOR POLYESTER BASE SYNTHETIC RESIN CONTAINING PLASTICIZER AND PLASTICIZER FOR BIODEGRADABLE RESIN

This Nonprovisional application claims priority under 35 U.S.C. § 119(a) on Patent Application No(s). 2002-327894 and 2003-005415 filed in Japan on Nov. 12, 2002 and Jan. 14, 2003, respectively, the entire contents of which are hereby incorporated by reference.

FIELD OF INVENTION

The present invention relates to an additive for a polyester base synthetic resin containing a plasticizer and a polyester base synthetic resin composition. The present invention also relates to a plasticizer for biodegradable resins and a biodegradable resin composition.

BACKGROUND OF THE INVENTION

Amorphous polyester resins that do not have a conspicuous melting point are used in the field of building materials such as decoration films for covering plywood, the field of food packaging materials such as food trays and blister packs, as well as for printed cards, magnetic cards and so on. Furthermore, polyester resins excellent in biodegradability such as polylactic acid are used in the field of agricultural civil engineering for materials such as flat yarns, nets, gardening materials, and pots for raising seeding, windowed envelopes, shopping bags, compost bags, writing materials, and miscellaneous goods. However, all of these applications are in the field of rigid mold products. These materials, being likely to be whitened when folded and deficient in flexibility, have not been used in soft applications or semi-rigid applications. There have been proposed various methods of adding a plasticizer as a technique to apply in the soft or semi-rigid field.

JP-B 2601737 proposes a technique in which by adding talc having a particular particle diameter and a hydroxy aliphatic glyceride by the respective particular ratios to an amorphous linear polyester resin, in the case of trays, blister packs and so on being stacked and stored, the detachability when these are peeled one by one (renesting properties) can be improved. Furthermore, JP-B 4-4652 proposes a technique in which by adding a particular ratio of a bis-amide compound to a biaxially stretched polyester film, the friction between films can be reduced and the traveling performance can be improved. Since these techniques intend to make a polyester resin composition that does not contain a plasticizer have a smaller friction coefficient between films and be easier in peeling, or easier in preventing resins from sticking onto rolls.

General purpose resins such as polyethylene, polypropylene, polyvinyl chloride, and polystyrene obtained from petroleum are used, because they are light weight, have excellent workability, and have physical properties such as durability, in various fields such as convenience goods, home electric appliances, automobile components, building materials or food packaging. However, when these resin products come to life's end and are discarded, the excellent durability disadvantageously works, that is, the decomposability in nature is inferior; accordingly, these may adversely affect the ecological system.

In order to overcome such problems, polymers that are thermoplastic resins and have biodegradability properties, including biodegradable polyester resins such as polylactic acid and copolymers of lactic acid and other aliphatic hydroxy carboxylic acids, and copolymers including aliphatic polyesters derived from aliphatic polyhydric alcohols and aliphatic polycarboxylic acids, and these units have been developed.

These biodegradable polymers, when placed in soil or seawater or within bodies of animals, owing to the operation of enzymes produced by microbes living in nature, start decomposing within several weeks, resulting in disappearance within from substantially one to several years. Furthermore, the decomposition products become lactic acid, carbon dioxide, water and so on, which are harmless to human bodies. Among the aliphatic polyesters, polylactic acid base resins are at present expected to be put into practical use and used in the field of agricultural civil engineeing materials such as flat yarns, nets, gardening materials, and pots for raising seeding, windowed envelopes, shopping bags, compost bags, writing materials, and miscellaneous goods. This is because L-lactic acid came to be mass-produced inexpensively from sugar obtained from sweet cone, yarn and so on by a fermentation method; the total carbon dioxide emissions are very small because raw material is a natural agricultural crop; and the toughness of such obtained polymers is large and the transparency is excellent. However, since the polylactic acid products are fragile, rigid and deficient in flexibility, applications thereof are limited to rigid molding articles. When it is molded in film, the flexibility is deficient and causes whitening when folded. Accordingly, it is not used at present in the soft applications or semi-rigid applications. As a technique applicable to the soft and semi-rigid field, methods of adding a plasticizer are variously proposed. For instance, a technique (JP-A 2000-302956) in which a plasticizer such as glycerin diacetyl monoaliphatic acid ester is added is disclosed. However, there are problems in that performances such as transparency and whitening resistance at folding are insufficient; furthermore, when a high temperature preservation test is applied assuming summer conditions, the transparency and the flexibility deteriorate remarkably, and the plasticizer bleeds out on a sheet surface.

SUMMARY OF THE INVENTION

The present invention (A) provides an additive to a polyester base synthetic resin, the additive comprising at least one compound selected from the group consisting of a hydroxy aliphatic monocarboxylic acid ester and a carboxylic acid amide.

Furthermore, the invention (A) provides a polyester base synthetic resin composition that comprises a polyester base synthetic resin, a plasticizer, and at least one kind selected from the group consisting of a hydroxy aliphatic monocarboxylic acid ester and a carboxylic acid amide.

The present invention (B) also provides a plasticizer for use in biodegradable resins comprising at least one compound selected from (i) to (iii) below:

(i) An ester selected from a hydroxy aromatic carboxylic acid ester and a hydroxy alicyclic carboxylic acid ester, (ii) a compound having a sulfonamide group, and (iii) an ester of the following (a) component with (b) component, (a) polycarbonate diol containing a repeating structural unit represented by a general formula (I') (hereinafter referred to as structural unit (I'))

(wherein n denotes an integer of 2 to 6.) and having a hydroxy group at each of both ends.

(b) At least one kind selected from an aromatic monocarboxylic acid represented by a general formula (II')

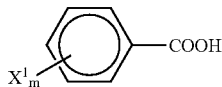

(wherein $X^1$ denotes a hydrogen atom, hydroxy group, a straight chain or branched alkyl group having 1 to 22 carbon atoms, an alkenyl group having 1 to 22 carbon atoms, or alkoxy group having 1 to 22 carbon atoms, or a halogen atom; m denotes an integer of 1 to 5; and m $X^1$'s may be the same or different from each other), condensed polycyclic aromatic monocarboxylic acid, alicyclic monocarboxylic acid, hydroxy condensed polycyclic aromatic monocarboxylic acid having one or more hydroxy groups in one molecule, hydroxy alicyclic monocarboxylic acid or anhydrides thereof, or lower alkyl ester having 1 to 3 carbon atoms.

In other preferred embodiments, the present invention (A) provides use of at least one compound selected from the group consisting of a hydroxy aliphatic monocarboxylic acid ester and a carboxylic acid amide as an additive to a polyester base synthetic resin containing a plasticizer.

In yet other preferred embodiments, the present invention (B) provides use of at least one compound selected from the above defined (i) to (iii) as a plasticizer for a biodegradable resin.

Figure 1:
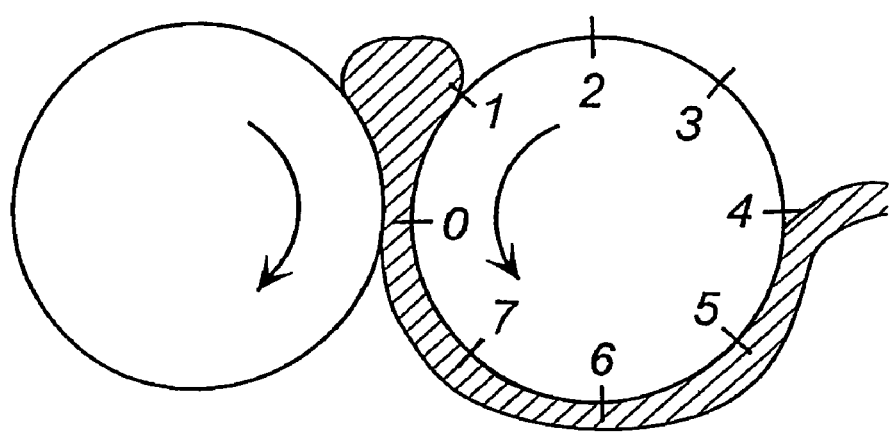
FIG. 1 is a schematic diagram of a roll used in the evaluation of the lubricity in the examples.

DETAILED DESCRIPTION OF THE INVENTION
(A)

There is a problem in a plasticizer-added polyester base resin film and sheet in that these films and sheets, when subjected to pressure and heat in a state where they are in contact with each other, tend to cause blocking and become incapable of peeling. Accordingly, there is a practical problem in that when a film thereof, after winding around a paper tube, is stored in a warehouse, the film adheres to itself and cannot be peeled at the time of use, resulting in incapability of taking out the film.

That is, when the plasticizer is contained, the glass transition temperature of the resin composition is lowered. Accordingly, under pressure and heating, polymers on a film surface are entangled with each other and form a state where these cannot be completely detached. As a result, problems utterly different from the problems in the renesting properties and the traveling performance such as mentioned above are caused. The conventional techniques have not been able to overcome the problems relating to the polyester resin composition that contains the plasticizer.

The present invention provides an additive for use in a plasticizer-containing polyester base synthetic resin that can inhibit blocking that has been a problem in a polyester base synthetic resin composition that is endowed with flexibility owing to a plasticizer from occurring, and furthermore can endow with ability for preventing of the resin to rolls (hereinafter referred to as slipping property) when the calendering process is applied; and a plasticizer-containing polyester base synthetic resin composition that is excellent in flexibility, blocking resistance, and furthermore in transparency and heat resistance.

[Additive for Polyester Base Synthetic Resin]

As the preferred hydroxy aliphatic monocarboxylic acid esters that can be used in the invention, esters of hydroxy aliphatic monocarboxylic acid with polyhydric alcohol and esters of hydroxy aliphatic monocarboxylic acid with monoalcohol can be used.

As the hydroxy aliphatic monocarboxylic acids, hydroxy aliphatic monocarboxylic acids having 8 to 22 carbon atoms such as 2-hydroxyoctanoic acid, 2-hydroxydecanoic acid, 2-hydroxytridecanoic acid, 16-hydroxyhexadecanoic acid, and 12-hydroxystearic acid can be preferably used; in particular, 12-hydroxystearic acid is preferable.

As the polyhydric alcohols, ethylene glycol, diethylene glycol, propylene glycol, 1,4-butanediol, 1,5-pentanediol, methylpentanediol, 1,6-hexanediol, trimethylol propane, glycerin, pentaerythritol, diglycerin and so on can be used, wherein glycerin and diglycerin being preferable.

As the monoalcohols, aliphatic monoalcohols having an alkyl or alkenyl group having 1 to 22 carbon atoms, in particular 1 to 10; alicyclic monoalcohols such as cyclohexyl alcohol, cyclohexane methanol, cyclopentyl alcohol, and cycloheptyl alcohol; and aromatic monoalcohols such as benzyl alcohol, methylbenzyl alcohol, and dimethylbenzyl alcohol can be used.

Among these, from the viewpoint of blocking resistance and compatibility with the resin, esters of hydroxy aliphatic monocarboxylic acids with polyhydric alcohols are preferable, esters of hydroxy aliphatic monocarboxylic acids with glycerins are more preferable, esters of hydroxy aliphatic monocarboxylic acids having 8 to 22 carbon atoms and glycerins are more preferable, and esters of 12-hydroxystearic acid with glycerins are even more preferable.

Among esters of 12-hydroxystearic acid with glycerins, 12-hydroxystearic acid triglyceride is particularly preferably contained. The 12-hydroxystearic acid triglyceride is generally contained as a main component in hardened castor oil and commercially available (Kao Wax 85P and so on available from Kao Corporation).

Furthermore, from the viewpoint of the bleeding resistance, the melting point of a hydroxy aliphatic monocarboxylic acid ester is preferably from 60 to 170° C., more preferably from 70 to 170° C., and even more preferably from 80 to 170° C.

As the carboxylic amides that can be used in the invention, amides of polyamines with monocarboxylic acids, amides of polycarboxylic acids with monoamines, and amides of monocarboxylic acids with ammonia can be included. As the polyamines, aliphatic diamines such as ethylenediamine, propylenediamine, hexamethylenediamine, 1,8-diaminooctane, and 1,12-diaminododecane; aromatic diamines such as m-xylylenediamine, o-xylylenediamine, p-xylylenediamine, p-diaminobenzene, 4,4'-diaminodiphenyl ether, and 1,5-diaminonaphthalene; alicyclic diamines such as 1,2-cyclohexanediamine; and aromatic triamines such as 1,2,4-triaminobenzene and so on can be used. As the monocarboxylic acids, aliphatic monocarboxylic acids such as acetic acid, butyric acid, valeic acid, caproic acid, caprylic acid, capric acid, lauric acid, myristic acid, palmitic acid, stearic acid, behenic acid, oleic acid, erucic acid, 2-ethylhexanoic acid, and 2-hexyldecanoic acid; aromatic monocarboxylic acids such as benzoic acid and 2-naphthalene carboxylic acid; hydroxy aliphatic monocarboxylic acids such as 12-hydroxystearic acid; and hydroxy aromatic monocarboxylic acids such as p-hydroxybenzoic acid, salicylic acid, and 3-hydroxy-2-naphthoic acid can be used. As the polycarboxylic acids, aliphatic dicarboxylic acids such as succinic acid, adipic acid, azelaic acid, and sebacic acid; and aromatic dicarboxylic acids such as isophthalic acid, terephthalic acid, and 2,6-naphthalene dicarboxylic acid can be used. As the monoamines, aromatic monoamines such as methylamine, n-butylamine, n-hexylamine, n-octylamine, laurylamine, stearylamine, behenylamine, oleylamine, 2-ethylhexylamine, t-butylamine, and s-octylamine; aromatic monoamines such as benzylamine, and naphthylamine; and alkanolamines such as monoethanolamine can be used.

Among the above carboxylic acids, preferable compounds from the viewpoint of attaining the advantages of the present invention are amides represented by the general formula (I) or (II).

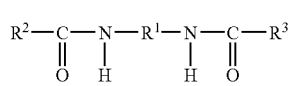

(I)

(wherein $R^1$ represents a straight chain or branched alkylene group having 1 to 12 carbon atoms, and $R^2$ and $R^3$ represent a straight chain or branched alkyl, alkenyl or hydroxyalkyl group having 3 to 21 carbon atoms and may be the same or different from each other.)

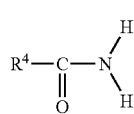

(II)

(wherein $R^4$ represents a straight chain or branched alkyl, alkenyl or hydroxyalkyl group having 3 to 21 carbon atoms.)

In general formula (I), from the viewpoint of blocking resistance, transparency and heat resistance of the polyester synthetic resin composition, the $R^1$ is preferably a straight chain or branched alkylene group having 1 to 6 carbon atoms and more preferably an ethylene group. In view of blocking resistance, transparency and heat resistance, the $R^2$ and $R^3$ are preferably a straight chain alkyl group having 5 to 21 carbon atoms or a straight chain hydroxyalkyl group having 5 to 17 carbon atoms, more preferably a straight chain alkyl group having 7 to 17 carbon atoms, and even more preferably a straight chain alkyl group having 9 to 17 carbon atoms.

In the general formula (II), from the viewpoint of blocking resistance, the $R^4$ is an alkyl, alkylene or hydroxyalkyl group having preferably 7 to 21 carbon atoms, and an alkyl, alkenyl or hydroxyalkyl group having more preferably 11 to 21 carbon atoms, and even more preferably having 15 to 21 carbon atoms.

In the carboxylic acid amides represented by the general formula (I) or (II), from the viewpoint of blocking resistance, transparency and heat resistance, carboxylic acid amides represented by the general formula (I) are furthermore preferable.

Among them, it is further preferred to use carboxylic acid amides which generally have a melting point higher than or equal to a temperature where a polyester base synthetic resin composition is used and lower than or equal to a processing temperature of the resin composition. When the melting point is greater than or equal to the working temperature, since the additive does not melt on a surface of a molded body, blocking resistance is excellent, dispersion into the resin is excellent at the processing temperature or less, resulting in not damaging blocking resistance and transparency. For that reason, from the viewpoint of blocking resistance, transparency and heat resistance, the melting points of carboxylic acid amides are preferably in the range of 60 to 200° C., more preferably 80 to 190° C., even more preferably 100 to 180° C. and even more preferably 120 to 170° C.

A molecular weight of carboxylic acid amide according to the invention, from the viewpoint of transparency and heat resistance, is preferably in the range of 200 to 800, more preferably 250 to 700 and even more preferably 300 to 650.

When an additive is used for use in a polyester base synthetic resin according to the invention, when the compatibility with the resin is too low, excessively bleeds out on a surface of the resin composition, accordingly, blocking resistance is improved; however, transparency and appearance of the resin composition deteriorate and furthermore, after heat treatment, the transparency is worsened. In the case of the compatibility being too excellent, the additive does not move on a surface of the resin composition, resulting in deteriorating the blocking resistance. Accordingly, the additive is preferably added in the range suitable for the compatibility with the resin. For that reason, from the viewpoint of blocking resistance, transparency and heat resistance, the solubility parameter (SP value (Fedors, $[(cal/cm^3)^{1/2}]$), Harasaki Yuji, KOTINGU NO KISOKAGAKU, Maki Shoten, p 54-56) of the additive for use in polyester base synthetic resin according to the invention is preferably in the range of (SP value of resin-3) to (SP value of resin), more preferably in the range of (SP value of resin-2.5) to (SP value of resin-1.0), and even more preferably in the range of (SP value of resin-2.5) to (SP value of resin-1.5). The SP value of, for instance, amorphous polyester resin that is preferably used in the invention (Manufactured by Eastman Chemicals Co., Tsunami GS2) is 12.2.

The additive for use in polyester base synthetic resin according to the invention may contain, as the anti-blocking agent, other than hydroxy aliphatic monocarboxylic acid ester and carboxylic acid amide, the following known anti-blocking components.

As other anti-blocking components, inorganic particles such as silica, alumina, and calcium carbonate; metal soaps such as calcium stearate and zinc stearate; polyhydric alcohol aliphatic acid esters such as dipentaerythritol hexastearate, and stearic acid monoglyceride; polycarboxylic acid esters such as tribehenyl trimellitate; hydrocarbon base waxes such as polyethylene wax and paraffin wax; alkyl ketene dimers such as stearylketene dimmer; alkylketones such as distearylketone; silicone oils such as alkyl-denatured silicone and polyether-denatured silicone; and perfluoroalkyl group-containing organic compounds can be used.

In the additive for use in polyester base synthetic resin according to the invention, a content of at least one kind selected from the group consisting of a hydroxy aliphatic monocarboxylic acid ester and a carboxylic acid amide, from the viewpoint of attaining the purpose of the invention, is preferably 80% by weight or more, more preferably 90% by weight or more, and still more preferably 95% by weight or more.

[Polyester Base Synthetic Resin]

As the polyester base synthetic resins according to the invention, although there is no particular restriction, polyesters that can be obtained through a condensation reaction between a dicarboxylic acid or an ester-forming derivative thereof and a diol or an ester-forming derivative thereof are preferable.

As specific examples of the polyester base synthetic resin, aromatic polyester resins such as polyalkylene terephthalates such as polyethylene terephthalate, polybutylene terephthalate, and polycyclohexanedimethylene terephthalate, and polyalkylene terephthalates containing polyalkylene naphthalates such as polyethylene naphthalate and polybutylene naphthalate; aliphatic polyester resins such as polyesters of adipic acid with 1,4-butanediol; and polyether ester resins in which a diol component is partially substituted with an alkylene glycol such as polyethylene glycol can be used. These can be used singly or in combination thereof.

Among these, from the viewpoint of blocking resistance, transparency and heat resistance, amorphous polyester resins, biodegradable polyesters such as polylactic acid are preferable, amorphous polyester resins and polylactic acids are particularly preferable.

In the present invention, the "amorphous polyester resin" preferably means a polyester resin of which half-crystallization time defined below is 5 minutes or more.

<Half-Crystallization Time>

First, 15 mg of polyester resin is weighed on an aluminum pan; by the use of a differential scanning calorimeter (DSC), it is heated at a rate of 300° C. per minute up to 300° C. and melted. Immediately thereafter, it is cooled at a rate of 300° C. per minute down to 160° C. and maintained there. When 160° C. is reached, a time measurement is started and a time when a heat generation peak top accompanying the crystallization observed in the DSC curve is reached is defined as the half-crystallization time.

As the DSC apparatus that is used here, as far as a temperature rise rate of 300° C. per minute or more and a cooling rate of 300° C. per minute or more with liquid nitrogen, liquid helium and so on are realizable, any apparatus can be used, and, for instance, a DSC unit DSC-7 available from Perkin-Elmer Co. and so on can be used.

Polyethylene terephthalate that is a crystalline polyester resin, being approximately 50 seconds in the half-crystallization time at 160° C., cannot be subjected to the calendering process. In the invention, the amorphous polyester resins, from the viewpoint of making the calendering process applicable, are polyester resins that preferably have the half-crystallization time of 5 minutes or more, more preferably of 10 minutes or more, and still more preferably do not exhibit a peak of crystallization even after an elapse of 12 hours (the half-crystallization time is hereinafter said to be infinite).

The amorphous polyester resins according to the invention, being low in the processing temperature in comparison with ordinary polyester resins having a processing temperature of from 270 to 280° C., can preferably be processed under the condition of 200° C. or less, more preferably even in the range of 160 to 190° C., and are excellent in processability; accordingly, the inventive polyester resins may be subjected to the calendering process. The processing temperature here means a temperature that can mold the resin; for instance, in the calendering process, it corresponds to a temperature of a roll surface that can mold the resin.

As specific examples of the amorphous polyester resin, there are amorphous polyester resins containing an aromatic dicarboxylic acid component as a dicarboxylic acid component such as polyester resins obtained by copolymerizing (A) terephthalic acid or lower alkyl ester thereof (alkyl group having 1 to 3 carbon atoms, for instance, terephthalic acid dimethyl and so on) (hereinafter, referred to as (A) component), (B) ethylene glycol (hereinafter, referred to as (B) component), and (C) dicarboxylic acids or lower alkyl esters thereof other than the terephthalic acid or lower alkyl ester thereof (alkyl group having 1 to 3 carbon atoms) (hereinafter, referred to as (C) component); polyester resins obtained by copolymerizing the (A) component, (B) component and (D) glycol components other than ethylene glycol (hereinafter, referred to as (D) component); and polyester resins obtained by copolymerizing the (A) component, (B) component, (C) component and (D) component.

As the (C) component, one kind or more selected from aromatic dicarboxylic acids, alicyclic dicarboxylic acids, aliphatic dicarboxylic acids and lower alkyl esters thereof can be used. As the aromatic carboxylic acid, isophthalic acid, phthalic acid, 2,6-naphthalene dicarboxylic acid, 1,5-naphthalene dicarboxylic acid, bis (4,4'-carboxyphenyl)methane, anthracene dicarboxylic acid, 4,4'-diphenylether dicarboxylic acid and so on can be used. As the alicylic dicarboxylic acid, 1,4-cyclohexane dicarboxylic acid, 4,4-dicyclohexyl dicarboxylic acid and so on can be used. As the aliphatic dicarboxylic acid, adipic acid, sebacic acid, azelaic acid, dimmer acid and so on can be used. Among the (C) components, isophthalic acid and lower alkyl esters thereof are preferable.

As the (D) component, one kind or more selected from 1,4-cyclohexanedimethanol, propylene glycol, 1,5-pentane diol, 1,6-hexanediol, neopentyl glycol, decamethylene glycol, 4,4'-dicyclohexyl hydroxymethane, 4,4'-dicyclohexyl hydroxy propane, bisphenol A ethylene oxide adduct diol, polyethylene oxide glycol, polypropylene oxide glycol and so on can be used.

In the dicarboxylic acid component in the amorphous polyester resin according to the invention, preferably the aromatic dicarboxylic acid component is 60% by mol or more, and more preferably the (A) component is 60% by mol or more. In addition, in the glycol component, the (B) component is preferably 60% by mol or more.

The glass transition temperatures of the amorphous polyester resins according to the invention are preferably in the range of 50 to 85° C. and more preferably 60 to 85° C.

As the amorphous polyester resins according to the invention, TSUNAMI GS1, GS2, GS3 and GS4 available from Eastman Chemical Corp. can be used.

The biodegradable polyester resin used in the invention is a polyester resin having the biodegradability defined based on JIS K6953 (ISO14855) "Aerobic and ultimate biodegradation degree and decay degree test under controlled aerobic compost condition".

The biodegradable polyester resin used in the invention needs to preferably have such a biodegradability that allows the polyester resin to decompose to have smaller molecular weights through microbes in the natural world. That is, there is no particular further limitation. For instance, aliphatic polyesters such as polyhydroxybutyrate, polycaprolactone, polybutylene succinate, polybutylene succinate/adipate, polyethylene succinate, polylactic acid base resin, polymalic acid, polyglycolic acid, polydioxanone, and poly(2-oxetanone); aliphatic aromatic copolyesters such as polybutylene succinate/terephthalate, polybutylene adipate/terephthalate, and polytetramethylene adipate/terephthalate; and mixtures between natural polymers such as starch, cellulose, chitin, chitosan, gluten, gelatin, zein, soy protein, collagen, and keratin and the above-mentioned aliphatic polyester or aliphatic aromatic copolyesters can be used.

Among these, from the viewpoint of the processability, economic efficiency, and the mass procurability, aliphatic polyesters are preferable, and from the viewpoint of the physical properties, polylactic acid base resins are more preferable. Here, the polylactic acid base resin means polylactic acid, or copolymers of lactic acid with hydroxycarboxylic acid. As the hydroxycarboxylic acid, glycolic acid, hydroxy-lactic acid, hydroxyvaleric acid, hydroxypentanoic acid, hydroxycaproic acid, hydroxyheptanoic acid, and so on can be used, and glycolic acid and hydroxycaproic acid are preferable. A preferable molecular structure of polylactic acid is one that is made of 20 to 100 mole percent of one lactic acid unit of L-lactic acid or D-lactic acid and 0 to 20 mole percent of lactic acid unit of a corresponding enantiomer??. Furthermore, a copolymer of lactic acid with hydroxycarboxylic acid is one that is made of 85 to 100 mole % of one lactic acid unit of L-lactic acid or D-lactic acid and 0 to 15 mole percent of hydroxycarboxylic acid unit. These lactic acid base resins can be obtained by selecting ones that have a necessary structure from L-lactic acid, D-lactic acid and hydroxycarboxylic acid as raw materials and by subjecting these to a dehydration polycondensation. Preferably, one having necessary structures are selected from lactide that is a cyclic dimmer of lactic acid, glycolide that is a cyclic dimmer of glycolic acid and caprolactone and subjected to the ring-opening polymerization, and thereby the lactic acid base resin can be obtained. In the lactides, there are L-lactide that is a cyclic dimmer of L-lactic acid, D-lactide that is a cyclic dimmer of D-lactic acid, meso-lactide that is a cyclic dimmer of D-lactic acid and L-lactic acid and DL-lactide that is a racemic mixture of D-lactide and L-lactide. In the present invention, any one of these lactides can be used. However, as the main raw material, D-lactide or L-lactide is preferable.

As commercially available biodegradable polyester resins, for instance, trade name Biomax manufactured by E.I. Dupont Inc.; trade name Ecoflex manufactured by BASF Corporation; trade name EasterBio manufactured by Eastman Chemicals Corporation; trade name Vionore manufactured by Showa Highpolymer Co.; trade name Mater Bi manufactured by The Nippon Synthetic Chemical Industry Co., Ltd.; trade name Lacty manufactured by Shimadzu Corporation; trade name Lacea manufactured by Mitsui Chemicals, Inc.; trade name Lunarle manufactured by Nippon Shokubai Co. Ltd.; trade name Novon manufactured by Chisso Corporation; and trade name EcoPLA manufactured by Cargill Dow Polymers can be used.

Among these, lactic acid base resins (trade name Lacea manufactured by Mitsui Chemicals, Inc.; and trade name EcoPLA manufactured by Cargill Dow Polymers), aliphatic polyesters such as polybutylene succinate (trade name Vionore manufactured by Showa Highpolymer Co.), and aliphatic aromatic copolyesters such as poly(butylene succinate/terephthalate) (trade name Biomax manufactured by E.I. Dupont Inc.,) can be preferably used.

[Plasticizer]

As the plasticizers that can be used in the invention, ones represented by the following (1) through (7) are preferable.

(1) Esters of the following (a) component with (b) component (a) At least one kind selected from hydroxy aromatic carboxylic acids represented by a general formula (III)

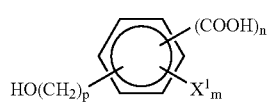

(III)

(wherein $X^1$ represents a hydrogen atom, hydroxy group, an alkyl, alkenyl or alkoxy group having 1 to 22 carbon atoms or halogen atom; and, n and m are each an integer of one or more, and n+m=5. p represents an integer of 0 to 3. m $X^1$s may be the same or different from each other.); hydroxy condensation polycyclic aromatic carboxylic acids having one or more of hydroxy groups and carboxyl groups in one molecule; hydroxy alicyclic carboxylic acids or anhydrides of these carboxylic acids; or lower alkyl esters having from 1 to 3 carbon atoms.

(b) At least one kind selected from hydroxy compounds selected from aliphatic alcohols, alicyclic alcohols, aromatic alcohols, phenols and alkylphenols, or alkylene oxide adducts of these hydroxy compounds (alkylene group having 2 to 4 carbon atoms, an average adduct mole number of alkylene oxide of larger than 0 and 30 or less).

(2) Esters of the following (c) component with (d) component (c) At least one kind selected from aromatic carboxylic acids represented by a general formula (IV)

(IV)

(wherein $X^2$ represents a hydrogen atom, methyl group or halogen atom; and, q and r are each an integer of one or more, and q+r=6. q $X^2$s may be the same or different from each other.); condensation polycyclic aromatic carboxylic acids having one or more carboxyl groups in one molecule; alicyclic carboxylic acids or anhydrides of these carboxylic acids; or lower alkyl esters having 1 to 3 carbon atoms.

(d) At least one kind selected from alkylene oxide adducts (alkylene group having 2 to 4 carbon atoms, an average adduct mole number of alkylene oxide of 1 to 30) of monohydroxy compounds selected from aliphatic monoalcohols, alicyclic monoalcohols, aromatic monoalcohols, phenols and alkylphenols.

(3) N-alkyl compounds of aromatic sulfone amide (alkyl group having 1 to 22 carbon atoms)

(4) Esters of the following (e) component with (f) component (e) At least one kind selected from aromatic monocarboxylic acids represented by a general formula (V)

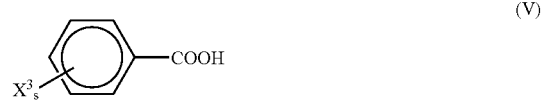

(V)

(wherein $X^3$ represents a hydrogen atom, alkyl group, alkenyl group or alkoxy group having 1 to 22 carbon atoms or halogen atom; and, s is an integer of 1 to 5. s $X^3$s may be the same or different from each other.); straight chain or branched aliphatic monocarboxylic acids having 1 to 22 carbon atoms; condensation polycyclic aromatic monocarboxylic acids; alicyclic monocarboxylic acids; or lower alkyl esters (alkyl group having 1 to 3 carbon atoms) of these monocarboxylic acids.

(f) At least one kind selected from aliphatic bi-valent alcohols represented by a general formula (VI)

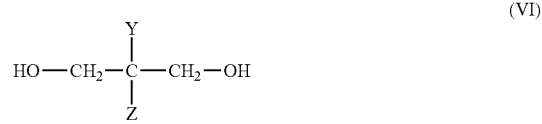

(VI)

(wherein Y and Z represent an alkyl group or alkenyl group having 1 to 8 carbon atoms and may be the same or different from each other.); polyhydric alcohols having three or more hydroxyl groups in one molecule and 3 to 30 carbon atoms; and alkylene oxide adducts of hydroxy compounds selected from alicyclic diols having two hydroxyl groups or methylol groups in one molecule (alkylene group having 2 to 4 carbon atoms, an average adduct mole number of alkylene oxide per one hydroxyl group of more than 0 and 10 or less).

(5) aliphatic dicarboxylic acid polyoxyalkylenealkylether ester, polyalkyleneglycol aliphatic acid ester or esters of aliphatic polyhydric alcohol with benzoic acid (6) Esters of the following (g) component with (h) component
Polycarbonate diol that contains a repeating structural unit (hereinafter, referred to as "structural unit (VII)") represented by a general formula (VII)

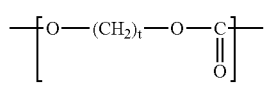

(VII)

(wherein t represents an integer of 2 to 6.) and hydroxyl groups at both ends.

(h) At least one kind selected from aromatic monocarboxylic acids represented by a general formula (VIII)

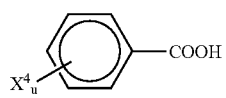

(VIII)

(wherein $X^4$ represents a hydrogen atom, hydroxy group, straight chain or branched alkyl group, alkenyl group or alkoxy group having 1 to 22 carbon atoms or halogen atom; and, u denotes an integer of 1 to 5, and u $X^4$'s may be the same or different from each other.); condensation polycyclic aromatic monocarboxylic acids; alicyclic monocarboxylic acid; hydroxy condensation polycyclic aromatic monocarboxylic acids having one or more hydroxyl groups in one molecule; hydroxy alicyclic monocarboxylic acids or anhydrides of these carboxylic acids; or lower alkyl esters having 1 to 3 carbon atoms.

(7) Esters between the following (i) component and (j) component (i) At least one kind selected from carboxylic acids having at least one cyano group or anhydrides of these carboxylic acids or lower alkyl esters having 1 to 3 carbon atoms.

(j) At least one kind selected from hydroxyl compounds selected from aliphatic alcohols, alicyclic alcohols, aromatic alcohols, phenols and alkyl phenols, or alkylene oxide adducts of these hydroxy compounds (alkylene group having 2 to 4 carbon atoms, an average adduct mole number of alkylene oxide of more than 0 and 30 or less).

As the esters according to the (1), esters obtained by combinations where the (a) component is p-hydroxy benzoic acid or salicylic acid and the (b) component is a compound represented by a general formula (IX)

$$R^5O(AO)_vH \qquad (IX)$$

(wherein $R^5$ is a hydrogen atom, a straight chain or branched alkyl or alkenyl group having 1 to 22 carbon atoms, phenyl group, benzyl group or alkyl phenyl group or alkyl benzyl group having an alkyl group having 1 to 18 carbon atoms, A is an alkylene group having 2 to 4 carbon atoms, v is the number of 0 to 30 denoting an average adduct mole number of alkylene oxide, and v A's may be the same or different from each other.), or an alkylene oxide adduct of polyhydric alcohol having 3 or more hydroxyl groups in a molecule and 3 to 30 carbon atoms (alkylene group having 2 to 4 carbon atoms, an average adduct mole number of alkylene oxide per one hydroxyl group of more than 0 and 10 or less) are preferable.

As the esters according to the (2), esters obtained by combinations where the (c) component is benzoic acid, phthalic acid, terephthalic acid, trimellitic acid, pyromellitic acid, naphthalene dicarboxylic acid, cyclohexane dicarboxylic acid or anhydrides thereof, or lower alkyl esters having from 1 to 3 carbon atoms, and the (d) component is a compound represented by a general formula (X)

$$R^6O(AO)_wH \qquad (X)$$

(wherein $R^6$ is a straight chain or branched alkyl or alkenyl group having 1 to 22 carbon atoms, phenyl group, benzyl group or alkyl phenyl group having an alkyl group having 1 to 18 carbon atoms, A is an alkylene group having 2 to 4 carbon atoms, w is the number of 1 to 30 denoting an average adduct mole number of alkylene oxide of from 1 to 30, and w A's may be the same or different from each other.) are preferable.

As the N-alkyl compounds according to (3) aromatic sulfone amides, N-alkyl benzene sulfone amides represented by a general formula (XI)

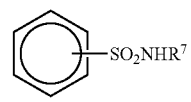

(XI)

(wherein $R^7$ denotes a straight chain or branched alkyl group having 1 to 22 carbon atoms.) are preferable.

As the esters according to the (4), esters obtained by combinations where the (e) component is benzoic acid that may have, as a substituent, an alkyl group having from 1 to 6 carbon atoms or a halogen atom or lower alkyl esters thereof (alkyl group having 1 to 3 carbon atoms), and the (f) component is an ethylene oxide adduct of neopentyl glycol, 2-butyl-2-ethyl-1,3-propane diol, glycerin, sorbitol, sorbitane, trimethylol propane, pentaerythritol, cyclohexane diol, and cyclohexane dimethanol (an average adduct mole number of ethylene oxide per one hydroxyl group of more than 0 and 10 or less) are preferable.

As the esters according to the (5), dipropylene glycol benzoic acid diester, ethylene glycol benzoic acid diester, neopentyl glycol benzoic acid diester, polyoxy ethylene methyl ether adipic acid diester and so on are preferable.

As the esters according to the (6), esters that are obtained by combinations where the (g) component is polycarbonate diol having an average molecular weight of 400 to 3000, in particular random or block polycarbonate diol that contains two kinds or more of structural units (VII) having different integers t and one kind of the structural units (VII) by 85% or less by molar ratio, and the (h) component is benzoic acid, salicylic acid, p-hydroxy benzoic acid or lower alkyl esters thereof having 1 to 3 carbon atoms are preferable.

As the esters according to the (7), esters that are obtained by combinations where (i) component is cyanoaromatic carboxylic acid represented by a general formula (XII)

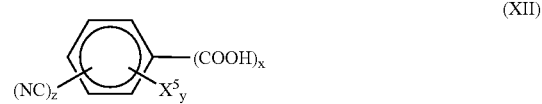

(XII)

(wherein $X^5$ denotes a hydrogen atom, hydroxyl group, a straight chain or branched alkyl, alkenyl or alkoxy group having 1 to 22 carbon atoms, or halogen atom, x, y and z are each an integer of 1 or more and x+y+z=6. y $X^5$s may be the same or different from each other.), cyanoaliphatic carboxylic acid represented by a general formula (XIII)

NC—(CH$_2$)$_a$—COOH (XIII)

(wherein a denotes an integer of 1 to 8.) or lower alkyl esters having 1 to 3 carbon atoms thereof, and (j) is a compound represented by a general formula (XIV)

R$^8$O(AO)$_b$H (XIV)

(wherein R$^8$ is a hydrogen atom, a straight chain or branched alkyl or alkenyl group having 1 to 22 carbon atoms, phenyl group, benzyl group or alkyl phenyl group or alkyl benzyl group having an alkyl group having 1 to 18 carbon atoms, A denotes an alkylene group having 2 to 4 carbon atoms, b is the number of 0 to 30 denoting an average adduct mole number of alkylene oxide, and b A's may be the same or different from each other.) are preferable.

In the plasticizers shown in the (1) to (7), from the viewpoint of blocking resistance, transparency and heat resistance, the plasticizers shown in the (1) are particularly preferable.

[Polyester Base Synthetic Resin Composition]

A polyester base synthetic resin composition according to the invention contains polyester base synthetic resins, at least one kind (hereinafter, referred to as the "anti-blocking agent according to the invention") selected from hydroxy aliphatic monocarboxylic acid esters and carboxylic acid amides, and a plasticizer.

The content of the anti-blocking agent according to the invention in the composition, with respect to 100 parts by weight of the polyester base synthetic resin, from the viewpoint of blocking resistance and the compatibility, is preferably in the range of 0.1 to 20 parts by weight, more preferably 0.5 to 10 parts by weight, even more preferably 1.0 to 5 parts by weight and even more preferably 1.2 to 3 parts by weight.

A content of the plasticizer in the composition, with respect to 100 parts by weight of the polyester base synthetic resin, from the viewpoint of flexibility, bleeding resistance and economic efficiency, is preferably in the range of 1 to 70 parts by weight, more preferably 5 to 50 parts by weight, and even more preferably 10 to 30 parts by weight.

The composition according to the invention can comprise, other than the above, other components such as a lubricant. As the lubricant, hydrocarbon base waxes such as polyethylene wax; aliphatic acids such as stearic acid and so on; aliphatic esters such as glycerol ester; metal soaps such as calcium stearate; ester waxes such as montanic acid wax; anionic surfactant having an aromatic ring such as alkyl benzene sulfonate; and anionic surfactant having an alkylene oxide adduct portion such as polyoxyethylene alkyl ether sulfate can be used. A content of the lubricant, with respect to 100 parts by weight of amorphous polyester resin, is preferably in the range of 0.05 to 3 parts by weight and more preferably 0.1 to 1.5 parts by weight.

The composition according to the invention, as other components other than the above, may contain an anti-static agent, anti-fogging agent, light stabilizer, UV absorbent, pigment, inorganic filler, fungicide, anti-microbial agent, foaming agent, flame retardant and so on up to an extent that does not disturb the achievement of the purpose of the present invention.

The composition according to the invention is excellent in the processability, that is, it can be processed at low temperatures of 160 to 190° C. For example, accordingly, the calendering process can be applied and furthermore the plasticizer is decomposed with difficulty. The composition according to the invention can be used in various applications by being molded into a film or sheet.

An additive according to the present invention can inhibit the blocking that has been a problem in a polyester base synthetic resin composition that is endowed with flexibility by a plasticizer, and furthermore can endow with the roll sliding properties when the calendering process is applied. In addition, a polyester base synthetic resin composition according to the invention is excellent in flexibility, blocking resistance, and furthermore in transparency and heat resistance.

DETAILED DESCRIPTION OF THE INVENTION
(B)

The present invention also provides a plasticizer for use in biodegradable resins that can, without disturbing the transparency of the biodegradable resins, impart flexibility, and a biodegradable resin composition excellent in flexibility, transparency and bleeding resistance, and furthermore in heat resistance.]

[Plasticizer]

A plasticizer according to the invention comprises at least one compound selected from (i) to (iii) above.

As the ester according to the (i), an ester of a (c) component with a (d) component below is preferable.

(c) At least one kind selected from a hydroxy aromatic carboxylic acid represented by a general formula (III')

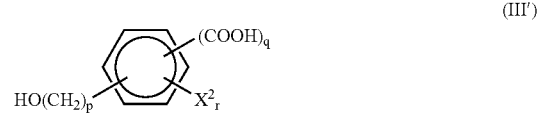

(wherein $X^2$ represents a hydrogen atom, hydroxy group, an alkyl, alkenyl or alkoxy group having 1 to 22 carbon atoms, or halogen atom; q and r each represent an integer larger than 1 and q+r=5; and p represents an integer of 0 to 3.), hydroxy condensed polycyclic aromatic carboxylic acid having one or more hydroxy groups and carboxyl groups in one molecule, hydroxy alicyclic carboxylic acid or anhydrides of the carboxylic acids, or lower alkyl ester having of 1 to 3 carbon atoms.

(d) At least one kind selected from hydroxy compounds selected from aliphatic alcohol, alicyclic alcohol, aromatic alcohol, phenol and alkyl phenol, or alkylene oxide adducts of the hydroxy compound (alkylene group having 2 to 4 carbon atoms, an average number of moles of adducted alkylene oxide being larger than 0 and 30 or less).

In the (c) component above, as the hydroxy aromatic carboxylic acids represented by the general formula (III'), p-hydroxy benzoic acid, salicylic acid, 4-hydroxy methyl benzoic acid, 5-hydroxy isophthalic acid, 2-hydroxy-3-methyl benzoic acid, 2-hydroxy-5-methyl benzoic acid, 2,4-dihydroxy benzoic acid, 2,3-dihydroxy benzoic acid, 3,4,5-trihydroxy benzoic acid, 4-hydroxy-3-methoxy benzoic acid and so on can be used; as the hydroxy condensed polycyclic aromatic carboxylic acids, 3-hydroxy-2-naphtoeic acid, 1-hydroxy-2-naphtoeic acid, 1,4-dihydroxy-2-naphtoeic acid and so on can be used; and as the hydroxy alicyclic carboxylic acids, 4-hydroxy cyclohexanoic acid and so on can be used.

Among these (c) components, p-hydroxy benzoic acid, salicylic acid, 4-hydroxy methyl benzoic acid, 5-hydroxy isophthalic acid, 3-hydroxy-2-naphtoeic acid, 2-hydroxy-5-methyl benzoic acid, 3,4,5-trihydroxy benzoic acid or their lower alkyl esters having 1 to 3 carbon atoms are preferable, and p-hydroxy benzoic acid, salicylic acid, 3,4,5-trihydroxy benzoic acid or their lower alkyl esters having 1 to 3 carbon atoms are even more preferable.

In the above (c) component, from the viewpoint of heat resistance, p-hydroxy benzoic acid, 3,4,5-trihydroxy benzoic acid or a C1-3 lower alkyl ester thereof are preferable.

In the above (d) components, from the viewpoint of the compatibility with the biodegradable resins, as the aliphatic alcohols, a monoalcohol having an alkyl group or alkenyl group having 1 to 22, in particular, 1 to 18 carbon atoms and a polyhydric alcohol having 3 to 30 carbon atoms are preferable. Furthermore, as the alicyclic alcohols, an alicyclic monoalcohol such as cyclohexyl alcohol, cyclohexane methanol, cyclopentyl alcohol, and cycloheptyl alcohol, and an alicyclic diol such as cyclohexane diol, cyclohexane dimethanol, cyclopentane diol, cyclopentane dimethanol, cycloheptane diol, and cycloheptane dimethanol can be used; and as the aromatic alcohols, benzyl alcohol, methyl benzyl alcohol, dimethyl benzyl alcohol and so on can be used. As the alkyl phenols, an alkyl phenol having an alkyl group having 1 to 18 carbon atoms is preferable, and nonyl phenol or octyl phenol is further preferable.

Among the (d) components, from the viewpoint of the compatibility with biodegradable resins and the volatilization resistance, a compound represented by a general formula (IV') is preferable.

$$R^1O(AO)_yH \qquad (IV')$$

(wherein $R^1$ denotes a hydrogen atom, a straight chain or branched alkyl or alkenyl group having 1 to 22 carbon atoms, phenyl group, benzyl group, or an alkylphenyl or alkylbenzyl group having an alkyl group having 1 to 18 carbon atoms; A denotes an alkylene group having 2 to 4 carbon atoms; y is a number of 0 to 30 showing an average number of moles of adducted alkylene oxide; and y A's may be the same or different from each other.)

In the general formula (IV'), $R^1$ is preferably a hydrogen atom or an alkyl group having 1 to 22 carbon atoms, and more preferably a hydrogen atom or an alkyl group having 1 to 18 carbon atoms. As the A, an ethylene group or a propylene group is preferable, and y is preferably a numeral 0 to 10. From the viewpoint of heat resistance, y is preferably a number of zero to 4.

In the (d) component constituting an ester according to (i), from the viewpoint of water whitening resistance, the A in the general formula (IV') is preferably 3 and 4 in the number of carbon atoms; in the case of the number of carbon atoms being 2, in the range of the ester of (i)/biodegradable resin (weight ratio) of from 5/100 and more and less than 20/100, a molar fraction of ethylene oxide (EO) adduct shown by the following formula is preferably in the range of 0 to 50%, and more preferably in the range of 0 to 40%.

$$\text{Molar fraction of EO adduct (\%)} = \frac{(44 \times \text{number of moles of EO adduct})}{(\text{molecular weight of plasticizer})} \times 100$$

Furthermore, in the case of the ester according to (i)/biodegradable resin (weight ratio) being in the range of 20/100 to 30/100, the molar fraction of EO adduct is preferably in the range of 0 to 40% and more preferably from 0 to 30%.

In the (d) component constituting an ester according to (i), from the viewpoint of flexibility, the water whitening resistance and heat resistance, a compound represented by a general formula (IV'-1) is preferable.

$$R^{1\text{-}1}OH \qquad (IV'\text{-}1)$$

(wherein the $R^{1\text{-}1}$ denotes a straight chain or branched alkyl or alkenyl group having 3 to 22 carbon atoms, benzyl group or an alkyl benzyl group having an alkyl group having 1 to 18 carbon atoms.)

In the general formula (IV'-1), the $R^{1\text{-}1}$ is preferably an alkyl group having 3 to 22 carbon atoms and more preferably an alkyl group having 6 to 16 carbon atoms.

The water whitening resistance here refers to a property that inhibits, when a composition that is obtained by adding a plasticizer according to the invention to a biodegradable resin is brought into contact with water for a long time, a surface thereof from turning white and thereby losing the transparency.

Furthermore, in the (d) component constituting an ester according to the (i), from the viewpoint of heat resistance, at least one compound selected from an aliphatic divalent alcohol, represented by the general formula (IV') in which $R^1$ is hydrogen atom and y=1, and an aliphatic divalent alcohol, represented by the general formula (V')

$$HO-CH_2-\underset{\underset{Z}{|}}{\overset{\overset{Y}{|}}{C}}-CH_2-OH \qquad (V')$$

(wherein Y and Z denote an alkyl or alkenyl group having 1 to 8 carbon atoms and may be the same as or different from each other.), a straight chain aliphatic divalent alcohol having 5 to 12 carbon atoms, a polyhydric alcohol having 3 or more hydroxy groups in one molecule and from 3 to 30 carbon atoms, or an alkylene oxide adduct (alkylene group having 2 to 4 carbon atoms, an average number of moles of adducted alkylene oxide per one hydroxy group being larger than 0 and 10 or less) of a hydroxy compound selected from alicyclic diols having 2 hydroxy groups or methylol groups in one molecule is preferable.

As the aliphatic divalent alcohol represented by the general formula (IV') in which $R^1$ is a hydrogen atom and y is 1, ethylene glycol, propylene glycol, tetramethylene glycol and so on can be included.

As the aliphatic divalent alcohols represented by the general formula (V), neopentyl glycol, 2-butyl-2-ethyl-1,3-propane diol and so on can be used. As the straight chain aliphatic divalent alcohols having 2 to 12 carbon atoms, ethylene glycol, propylene glycol, tetramethylene glycol, hexylene glycol and so on can be used. As the polyhydric alcohols having 3 or more hydroxy groups in one molecule and 3 to 30 carbon atoms, glycerin or polyglycerin having 3 to 30, preferably 3 to 12 carbon atoms, sorbitol, sorbitan, trimethylol propane, pentaerythritol and so on can be used. Furthermore, as the alicyclic diols having two hydroxy groups or methylol groups in one molecule, cyclohexane diol, cyclohexane dimethanol, cyclopentane diol, cyclopentane dimethanol, cycloheptane diol, cycloheptane dimethanol and so on can be used, cyclohexane diol and cyclohexane dimethanol being preferable.

Still furthermore, as the alkylene oxide adducts, ethylene oxide adduct and propylene oxide adduct are preferable, and ethylene oxide adduct is particularly preferable. An average number of moles of adducted alkylene oxide per one hydroxy group is larger than 0 and 10 or less, preferably 1 to 8, and more preferably 1 to 6.

The esters according to (i) can be obtained, through an esterification reaction or ester exchange reaction, between the (c) component and (d) component as mentioned above. As specific manufacturing methods, for instance, a method in which the (c) component and the (d) component, in the presence of an organometallic catalyst such as dibutyl tin oxide by an amount of 0.01 to 0.5% by weight with respect to a total charge amount of the (c) component and (d) component, with the (d) component charged excessively than the (c) component, are esterified at a temperature in the range of 190° C. to 230° C. followed by steam distillation to remove the excessive (d) component; another method in which the (c) component that is a methyl ester of aromatic monocarboxylic acid represented by a general formula (III) and the (d) component, in the presence of an organometallic catalyst such as dibutyl tin oxide by an amount of 0.01 to 0.5% by weight with respect to a total charge amount of the (c) component and (d) component, undergoes ester exchange reaction at a temperature in the range of 160° C. to 210° C.; and still another method in which the (c) component and the (d) component, in the presence of an oxide catalyst such as methane sulfonic acid by an amount of 0.1 to 1% by weight with respect to a total charge amount of the (c) component and (d) component, with the (d) component charged excessively than the (c) component, are esterified at a temperature in the range of 100° C. to 150° C. followed by neutralizing with sodium hydroxide equivalent in an amount with the oxide catalyst further followed by applying steam distillation to remove the excessive (d) component still further followed by filtering can be used. The ester may be a partial ester or a total ester, the total ester being preferable from the viewpoint of the compatibility with resins and heat resistance.

The esters according to the (i), from the viewpoint of the compatibility with resins and the water whitening resistance, are preferably esters obtained from combinations where the (c) component is p-hydroxy benzoic acid or salicylic acid and the (d) component is a compound represented by the general formula (IV'-1); in particular, an ester obtained from a combination where the (c) component is p-hydroxy benzoic acid and the (d) component is 2-ethylhexanol or n-octanol is preferable. Furthermore, from the viewpoint of the biodegradability, an ester obtained from a combination where the (c) component is p-hydroxy benzoic acid and the (d) component is a compound represented by the general formula (IV') is preferable.

From the viewpoint of biodegradability, it is then preferable in the compound represented by the formula (IV') that R1 is a straight chain alkyl or alkenyl group having 6 to 18 carbon atoms, or an alkyl or alkenyl group having a branched chain having 6 to 18 carbon atoms; A is ethylene group and y is a number of zero to 10.

As the compounds that have a sulfonamide group according to (ii), aromatic sulfonamides such as benzene sulfonamide, toluene sulfonamide, dodecylbenzene sulfonamide, and naphthalene sulfonamide; aliphatic sulfonamides such as octyl sulfonamide, and dodecyl sulfonamide; and N-substitution compounds such as N-alkylations, N-phenylations, and N-benzylations of these sulfonamides can be used. Among these, from the viewpoint of the compatibility with the biodegradable resins, aromatic compounds having a sulfonamide group are preferable.

Furthermore preferable ones as the aromatic compounds having a sulfonamide group are compounds represented by a general formula (VI').

(wherein $R^2$ and $R^3$ independently represent an aliphatic group or alicyclic group selected from a straight chain or branched alkyl group having 1 to 22 carbon atoms, alicyclic alkyl group, alkenyl group or alkoxy group, or an aromatic group selected from a phenyl group, alkyl phenyl group in which at least one hydrogen atom of a phenyl group is substituted with an alkyl group having 1 to 22 carbon atoms, benzyl group or condensed polycyclic aromatic group, and at least one of $R^2$ and $R^3$ is an aromatic group.)

In the general formula (VI'), from the viewpoint of the compatibility with biodegradable resins, transparency, bleeding resistance and heat resistance, $R^2$ is preferably a phenyl group, alkyl phenyl group of which alkyl group has 1 to 22 carbon atoms, benzyl group, aromatic group such as naphthyl group, or a straight chain or branched alkyl group having 1 to 22 carbon atoms, more preferably a phenyl group, alkyl phenyl group of which alkyl group has 1 to 22 carbon atoms, benzyl group, aromatic group such as naphthyl group, and particularly preferably a phenyl group and alkyl phenyl group of which alkyl group has 1 to 22 carbon atoms. The $R^3$, in the case of the $R^2$ being an aromatic group, from the viewpoint of flexibility and compatibility, is preferably a straight chain or branched alkyl group having 1 to 22 carbon atoms or an alicyclic alkyl group, more preferably a straight chain or branched alkyl group having 2 to 18 carbon atoms, and most preferably a straight chain or branched alkyl group having 4 to 12 carbon atoms. Furthermore, the $R^3$, in the case of the $R^2$ being a straight chain or branched alkyl group having 1 to 22 carbon atoms, from the viewpoint of the compatibility, is preferably a phenyl group, benzyl group or naphthyl group, and more preferably a phenyl group or benzyl group.

As the (a) component that constitutes an ester according to the (iii), a compound containing one kind structural unit (I) in which n is selected from 2 to 6 and preferably one kind structural unit (I) in which n is selected from 4 to 6; a compound containing two kind structural units (I) in which n is selected from 2 to 6 and preferably structural units (I) in which n is 5 and 6 or 4 and 6; and a compound containing three kind structural units (I) in which n is selected from 2 to 6 and preferably n is 4, 5 and 6 can be used. Among these, from the viewpoint of the compatibility with biodegradable resins and flexibility endowment, one containing structural units (I) in which n is from 4 to 6 is preferable, one containing two kinds or more structural units (I) having different integers n is more preferable, and one containing two kinds or more structural units (I) in which n is selected from 4 to 6 is particularly preferable. Furthermore, in the case of two kinds or more structural units (I) having different integers n being contained, these may combine randomly or in block. Still furthermore, from the viewpoint of the compatibility with biodegradable resins, a molar fraction of one kind structural unit (I) is preferably 85% or less, more preferably 70% or less and even more preferably 60% or less.

An average molecular weight of the (a) component that constitutes an ester according to (iii), from the viewpoint of the compatibility with biodegradable resins, is preferably in the range of 400 to 3000, more preferably 600 to 2500, and even more preferably 800 to 2000. The average molecular weight is a number average molecular weight obtained from a hydroxyl value of the (a) component.

In the (b) component that constitutes an ester according to (iii), as the aromatic monocarboxylic acids represented by the general formula (II'), benzoic acid and benzoic acids having, as a substituent group, a hydroxy group, a 1 to 22 carbon atom-, preferably 1 to 12 carbon atom-containing alkyl, alkenyl or alkoxy group, or 1 to 5, preferably 1 to 2, halogen atoms such as chlorine atom and bromine atom can be used. Specifically, benzoic acid, salicylic acid, p-hydroxy benzoic acid, methyl benzoic acid, n-decyl benzoic acid, isodecyl benzoic acid, 2-hydroxy-3-methyl benzoic acid, 2-hydroxy-5-methyl benzoic acid, 2,4-dihydroxy benzoic acid, 2,3-dihydroxy benzoic acid, 3,4,5-trihydroxy benzoic acid, 4-hydroxy-3-methoxy benzoic acid and so on can be used. As the condensed polycyclic aromatic monocarboxylic acids, α-naphthalene carboxylic acid, β-naphthalene carboxylic acid and so on can be used. As the alicyclic monocarboxylic acids, cyclohexane carboxylic acid, cyclopentane carboxylic acid, cycloheptane carboxylic acid and so on can be used. As the hydroxy condensed polycyclic aromatic monocarboxylic acids having one or more hydroxy group in one molecule, 3-hydroxy-2-naphtoeic acid, 1-hydroxy-2-naphtoeic acid, 1,4-dihydroxy-2-naphtoeic acid and so on can be used. As the hydroxy alicyclic monocarboxylic acids, 4-hydroxy cyclohexanoic acid and so on can be used.

Among these (b) components, benzoic acid, salicylic acid, p-hydroxy benzoic acid, or their lower alkyl esters having 1 to 3 carbon atoms are preferable, and in particular from the viewpoint of heat resistance, salicylic acid is preferable.

The esters according to (iii) can be obtained through the esterification reaction or the ester exchange reaction between the (a) component and (b) component as mentioned above. As specific manufacturing methods, for instance, a method in which the (a) component and the (b) component, in the presence of a 0.01 to 0.5% by weight organometallic catalyst such as dibutyl tin oxide with respect to a total charge amount of the (a) component and (b) component, are esterified at a temperature in the range of 190° C. to 230° C.; and another method in which an excessive (b) component that is a methyl ester of aromatic monocarboxylic acid represented by the general formula (II') and the (a) component, in the presence of a 0.01 to 0.50% by weight organometallic catalyst such as dibutyl tin oxide with respect to a total charge amount of the (a) component and (b) component, undergoes an ester exchange reaction at a temperature in the range of 170° C. to 230° C. followed by steam distillation to remove the excessive (b) component can be used. The ester may be a partial ester or a total ester, the total ester being preferable from the viewpoint of the compatibility with biodegradable resins and heat resistance.

The ester according to the (iii), from the viewpoint of the compatibility with the biodegradable resins, is preferably an ester obtained from a combination where the (a) component is polycarbonate diol containing two kinds or more structural units (I) in which n is selected from 4 to 6 and the (b) component is benzoic acid, salicylic acid, or p-hydroxy benzoic acid, and particularly preferably an ester obtained from a combination where the (a) component is polycarbonate diol that contains two kinds or more structural units (I) in which n is selected from 4 to 6 and has a molar fraction of one kind structural unit of 85% or less, and the (b) component is salicylic acid.

The plasticizer according to the invention comprises at least one compound selected from the (i) to (iii). From the view point of heat resistance, a plasticizer containing the compound (i) or (ii) is preferable. A plasticizer containing the ester (i) is more preferable. From the viewpoint of biodegradability, a plasticizer containing the ester (i) is preferable.

The plasticizer according to the invention may contain, other than the compounds selected from the (i) to (iii), unreacted components in the manufacture of the compounds, esters other than the esters according to (i) and (iii) and plasticizers other than the compounds according to the (i) to (iii).

As the esters other than the esters according to (i) and (iii), dipropylene glycol dibenzoate, ethylene glycol dibenzoate, neopentyl glycol dibenzoate, polyoxyethylene methyl ether adipic acid diester and so on can be used. As the plasticizers other than the compounds according to the (i) to (iii), acetylated monoglyceride, acetylated tributyl citrate and so on can be used.

Among the plasticizers according to the invention, a content of a compound selected from the (i) to (iii), from the viewpoint of achieving the purpose of the invention, is preferably 50% by weight or more, more preferably 70% by weight or more and further more preferably 90% or more.

[Biodegradable Resin]

The biodegradable polyester resin used in the invention is a polyester resin preferably having the biodegradability based on JIS K6953 (ISO14855) "Examination on the ultimate aerobic biodegradability and disintegration under controlled composting conditions-Method by analysis".

The biodegradable resins used in the invention need only have the biodegradability owing to which the resins are decomposed to smaller molecular weight compounds via the intervention of microbes in a natural world. That is, there is no particular restriction thereon. For instance, aliphatic polyesters such as polyhydroxybutyrate, polycaprolactone, polybutylene succinate, polybutylene succinate/adipate, polyethylene succinate, polylactic acid base resins, polymalic acid, polyglycolic acid, polydioxanone, and poly(2-oxetanone); aliphatic aromatic copolyesters such as polybutylene succinate/terephthalate, polybutylene adipate/terephthalate, and polytetramethylene adipate/terephthalate; and mixtures between natural polymers such as starch, cellulose, chitin, chitosan, gluten, gelatin, zein, soy bean albumin, collagen, and keratin and the above-mentioned aliphatic polyesters or aliphatic aromatic copolyesters can be used.

Among these, from the viewpoint of the processability, the economic efficiency, and the mass procurability, aliphatic polyesters are preferable, and from the viewpoint of the physical properties, polylactic acid base resins are more preferable. Here, the polylactic acid base resin refers to copolymer of polylactic acid or lactic acid with hydroxycarboxylic acid. As the hydroxycarboxylic acids, glycolic acid, hydroxybutyric acid, hydroxyvaleric acid, hydroxypentanoic acid, hydroxycaproic acid, hydroxyheptanoic acid and so on can be used, and glycolic acid and hydroxycaproic acid are preferable. A preferable molecular structure of polylactic acid is one that is made of 20 to 100 mole percent one lactic acid unit of L-lactic acid or D-lactic acid and 0 to 20 mole percent lactic acid unit of a corresponding enantiomer. Furthermore, a copolymer of lactic acid with hydroxycarboxylic acid is one that is made of 85 to 100 mole percent one lactic acid unit of L-lactic acid or D-lactic acid and 0 to 15 mole percent hydroxycarboxylic acid unit. These lactic acid base resins can be obtained by selecting ones that have a necessary structure from L-lactic acid, D-lactic acid and hydroxycarboxylic acid as raw materials and by subjecting these to the dehydration polycondensation. Preferably, ones having necessary structures are selected from lactides that are cyclic dimmers of lactic acid, glycolides that are cyclic dimmers of glycolic acid and caprolactones, and these are subjected to the ring-opening polymerization, and thereby a lactic acid base resin can be obtained. In the lactides, there are L-lactide that is a cyclic dimmer of L-lactic acid, D-lactide that is a cyclic dimmer of D-lactic acid, meso-lactide that is a cyclic dimmer between D-lactic acid and L-lactic acid and DL-lactide that is a racemic mixture of D-lactide and L-lactide. In the present invention, any one of these lactides can be used. However, as the main raw material, D-lactide or L-lactide is preferable.

As commercially available biodegradable polyester resins, for instance, trade name Biomax manufactured by E.I. Dupont Inc., trade name Ecoflex manufactured by BASF Corporation, trade name EasterBio manufactured by Eastman Chemicals Corporation, trade name Bionore manufactured by Showa Highpolymer Co., trade name MATERBY manufactured by The Nippon Synthetic Chemical Industry Co., Ltd., trade name Lacty manufactured by Shimadzu Corporation, trade name LACEA manufactured by Mitsui Chemicals, Inc., trade name Lunare manufactured by Nippon Shokubai Co., Ltd., trade name NOBON manufactured by Chisso Corporation, and trade name EcoPLA manufactured by Cargill Dow Polymers can be used.

Among these, lactic acid base resins (for instance, trade name LACEA manufactured by Mitsui Chemicals, Inc. and trade name EcoPLA manufactured by Cargill Dow Polymers), aliphatic polyesters such as polybutylene succinate (for instance, trade name Bionore manufactured by Showa Highpolymer Co.), and aliphatic aromatic copolyesters such as poly(butylene succinate/terephthalate) (for instance, trade name Biomax manufactured by E.I. Dupont Inc.,) can be preferably used.

From the viewpoint of heat resistance, crystalline biodegradable resins high in the L-lactic acid purity are preferable; accordingly, orientation and crystallization are preferably introduced owing to stretching. As the crystalline biodegradable resins, LACEA H-100, H-400, H-440 and so on available from Mitsui Chemicals Inc. are preferable.

[Biodegradable Resin Composition]

A biodegradable resin composition according to the invention comprises a plasticizer according to the invention and a biodegradable resin. A content of the plasticizer according to the invention is, with respect to 100 parts by weight biodegradable resin, from the viewpoint of flexibility, bleeding resistance and economic efficiency, preferably from 1 to 70 parts by weight, more preferably 3 to 50 parts by weight, and even more preferably 5 to 30 parts by weight.

The composition according to the invention, other than the above plasticizers, can contain other components such as a lubricant. As the lubricant, for instance, hydrocarbon base waxes such as polyethylene wax; aliphatic acids such as stearic acid; aliphatic acid esters such as glycerol ester; metal soaps such as calcium stearate; ester waxes such as montanic acid wax; anionic surfactant having an aromatic ring such as alkyl benzene sulfonate; and anionic surfactant having an alkylene oxide adduct portion such as polyoxyethylene alkyl ether sulfate can be used. A content of these lubricants, with respect to 100 parts by weight of biodegradable resin, is preferably in the range of 0.05 to 3 parts by weight and more preferably 0.1 to 2 parts by weight.

The composition according to the invention, as other components other than the above, may contain an anti-static agent, anti-fogging agent, light stabilizer, UV absorbent, pigment, inorganic filler, fungicide, anti-microbial agent, foaming agent, flame retardant, plasticizer other than the above plasticizers according to the invention and so on within the range where the achievement of the purpose of the present invention is not disturbed.

The composition according to the invention is excellent in the processability, that is, can preferably be processed at such a low temperature as in the range of from 130° C. to 190° C.; accordingly, the calendering process can be applied; and furthermore, the plasticizer is decomposed with difficulty. The composition according to the invention, when molded into films or sheets, can be used in various applications.

A plasticizer according to the invention can impart flexibility without disturbing the transparency of a biodegradable resin, and can inhibit whitening from occurring when a sheet or a film made of a biodegradable resin composition according to the invention is folded, and furthermore, even when preserved in a high temperature atmosphere, the flexibility and the transparency do not vary; that is, heat resistance is excellent, and still furthermore, since the plasticizer itself is excellent in the biodegradability, the biodegradability of the biodegradable resin composition according to the invention becomes also excellent.

EXAMPLES

The part in examples means "parts by weight" unless otherwise noted.

Examples 1 to 30 are examples of the invention (A); and examples 31 to 42 are examples of the invention (B).

Examples 1 to 12 and Comparative Examples 1 to 4

A composition including 100 parts of amorphous polyester resin (Tsumani GS-2: manufactured by Eastman Chemicals Corporation, the glass transition temperature: 81° C., the half-crystallization time: infinity), 0.8 part of straight chain dodecylbenzene sodium sulfonate, and a plasticizer and an anti-blocking agent of which kind and amount are shown in Tables 1 and 2 is kneaded for 15 minutes at 160° C. by the use of a 6-inch roll followed by evaluating the lubricity according to the following method. Furthermore, with the resin composition, a test piece having a thickness of 0.5 mm was formed by the use of a press machine set at 190° C.

The obtained test piece was evaluated for flexibility, blocking resistance, and its surface state. Results are shown in Tables 1 and 2.

<Method of Evaluating Flexibility>

The test piece was punched out with a #3 dumbbell, left for 24 hr in a thermostatic chamber controlled at 23° C. and 50% humidity, and subjected to a tension test at a tension rate of 20 mm per minute. The result was shown in terms of 100% modulus.

<Method of Evaluating Blocking Resistance>

The test piece was punched out in a size of 6 cm (width)×6 cm (breadth)×0.5 cm (thickness). Two samples thereof were laminated, sandwiched with two glass plates of 10 cm×10 cm×5 mm (thickness), and, with 1 kg of weight placed on the glass plate, treated for 4 hr in an oven controlled at 60° C. After leaving and cooling at room temperature, the sample was subjected to the peel test. The result was evaluated according to the following criteria.

◯: The samples do not adhere to each other and can be easily peeled.

X: The samples adhere to each other and cannot be peeled from each other.

<Surface State (Bleeding or Not)>

A test piece (width 100 mm×breadth 100 mm×thickness 0.5 mm) was left for one week in a thermostatic chamber controlled at 40° C., and thereafter whether the plasticizer bled out or not on a surface thereof was visually observed.

<Method of Evaluating Lubricity>

The resin composition was put in a 6-inch roll shown in FIG. 1 that was set at a roll temperature of 160° C., the number of revolutions of 20 r/m and a gap of 1 mm, kneaded for 15 minutes, followed by peeling off the roll. The peelability from the roll was evaluated from a peeling position shown in FIG. 1 according to the following criteria.

Peel position 0: A sheet does not peel off the roll and cannot be processed.

Peel position 1: The sheet peeled off the roll with difficulty; that is, the processability is very bad.

Peel position 2: The sheet, though being peeled off the roll with difficulty, can be processed.

Peel position 3: The sheet, though being peeled off the roll with a slight difficulty, can be excellently processed.

Peel position 4, 5: The sheet can be easily peeled off the roll and has appropriate twining; therefore, the processability is very good.

Peel position 6: The sheet badly twines the roll; that is, the processability is slightly bad.

Peel position 7: The sheet does not twine the roll and cannot be kneaded.

TABLE 1

| Example | Plasticizer | Added amount (part) | Annti-blocking agent | Added amount (part) | Flexibility 100% modulus (MPa) | Blocking resistance | Whether a surface exibits bleeding or not | Lubricity (peel position) |
|---|---|---|---|---|---|---|---|---|
| 1 | 2-ethylhexanol p-hydroxy benzoic acid monoester | 15 | 12-hyroxy Stearic acid triglyceride*3 | 1.5 | 11.5 | ○ | None | 4 |
| 2 | 2-ethylhexanol p-thydroxy benzoic acid monoester | 20 | 12-hyroxy Stearic acid triglyceride*3 | 2.0 | 7.6 | ○ | None | 4~5 |
| 3 | POE(16)pentae erythritol salicylic acid tetraester*1 | 25 | 12-hyroxy Stearic acid triglyceride*3 | 2.0 | 10.1 | ○ | None | 5 |
| 4 | POE(4)methyl ether trimellitic acid triester*1 | 20 | 12-hyroxy Stearic acid triglyceride*3 | 2.0 | 9.3 | ○ | None | 4 |
| 5 | PCDL(5651)salicylic acid diester*2 | 30 | 12-hyroxy Stearic acid triglyceride*3 | 2.0 | 8.8 | ○ | None | 4~5 |
| 6 | Dipropylene glycol benzoic acid diester | 25 | 12-hyroxy Stearic acid triglyceride*3 | 3.0 | 7.4 | ○ | None | 4 |

TABLE 2

| | Plasticizer | Added amount (part) | Anti-blocking agent | Added amount (part) | Flexibility 100% modulus (MPa) | Blocking resistance | Whether a surface exibits bleeding or not | Lubricity (peel position) |
|---|---|---|---|---|---|---|---|---|
| Example | | | | | | | | |
| 7 | 2-ethylhexanol p-hydroxy benzoic acid monoester | 15 | Ethylene bis-decanoic acid amide*4 | 1.5 | 11.5 | ○ | None | 5 |
| 8 | 2-ethylhexanol p-hydroxy benzoic acid monoester | 20 | Ethylene bis-decanoic acid amide*4 | 1.5 | 7.7 | ○ | None | 5 |
| 9 | 2-ethylhexanol p-hyroxy benzoic acid monoester | 20 | Ethylene bis-dodecanoic acid amide*5 | 1.5 | 7.6 | ○ | None | 5 |
| 10 | 2-ethylhexanol p-hydroxy benzoic acid monoester | 25 | hexamethylene bis-decanoic acid amide*6 | 2.0 | 5.2 | ○ | None | 5 |
| 11 | 2-ethylhexanol p-hydroxy benzoic acid monoester | 20 | Ethylene bis 12-hydroxy stearic acid amide*7 | 2.0 | 7.5 | ○ | None | 5 |
| 12 | 2-ethylhexanol p-hydroxy benzoic acid monoester | 20 | 12-hydroxy stearic acid amide*8 | 3.0 | 7.6 | ○ | None | 4 |
| Comparative Example | | | | | | | | |
| 1 | 2-ethylhexanol p-hydroxy benzoic acid monoester | 20 | — | — | 7.6 | X | None | 0 |
| 2 | 2-ethylhexanol p-hydroxy benzoic acid monoester | 20 | Silton AMT08 (amorphous aluminosilicate) | 2.0 | 4.4 | X | None | 0 |
| 3 | 2-ethylhexanol p-hydroxy benzoic acid monoester | 20 | Pentaerythritol tetrastearate*9 | 2.0 | 7.5 | X | None | 2 |

TABLE 2-continued

| | Plasticizer | Added amount (part) | Anti-blocking agent | Added amount (part) | Flexibility 100% modulus (MPa) | Blocking resistance | Whether a surface exibits bleeding or not | Lubricity (peel position) |
|---|---|---|---|---|---|---|---|---|
| 4 | 2-ethylhexanol p-hydroxy benzoic acid monoester | 20 | Behenic acid monoglyceride[*10] | 3.0 | 7.5 | X | None | 1~2 |

[*1] POE (n) denotes a polyoxyethylene chain to which n moles on the average of ethylene oxide are added
[*2] Diester of PCDL (5651) (manufactured by Asahi Chemical Industry Co., Ltd., polycarbonate diol that comprises ones having t = 5 and t = 6 in the structural unit (VII) by 50/50 by molar ratio and an average molecular weight of 984) with salicylic acid
[*3] Melting point 86° C., and SP value 9.8
[*4] Melting point 165° C., SP value 10.3, and molecular weight 369
[*5] Melting point 160° C., SP value 10.0, and molecular weight 425
[*6] Melting point 143° C., SP value 10.0, and molecular weight 425
[*7] Melting point 142° C., SP value 10.4, and molecular weight 625
[*8] Melting point 96° C., SP value 10.7, and molecular weight 300
[*9] Melting point 51° C., SP value 8.93, and molecular weight 1163
[*10] Melting point 76° C., SP value 10.1, and molecular weight 601

Examples 13 to 18 and
Comparative Examples 5 and 6

A composition including 100 parts of amorphous polyester resin (Tsumani GS2: manufactured by Eastman Chemicals Corporation, the glass transition temperature: 81° C., and the half-crystallization time: infinity), 0.8 parts of straight chain dodecylbenzene sodium sulfonate, and a plasticizer and an anti-blocking agent of which kind and amount are shown in Table 3 is kneaded for 15 minutes at 160° C. by the use of a 6-inch roll followed by preparing test pieces having a thickness of 0.5 mm by the use of a press machine set at 190° C.

The obtained test piece was evaluated of transparency according to a method described below and flexibility and surface state according to the method described above. Furthermore, in order to evaluate the heat resistance, the test piece was put in an oven set at 60° C., left for one week and cooled at room temperature, and flexibility, transparency and surface state were similarly evaluated. Results are shown in Table 3.

<Method of Evaluating Transparency>

With a haze meter, a haze value of the test piece was measured. The smaller the figure, the better the transparency.

TABLE 3

| | | | | | Before heat treatment | | | After heat treatment (at 60° C. × 1 week) | | |
|---|---|---|---|---|---|---|---|---|---|---|
| | Plasticizer | Added amount (part) | Anti-blocking agent | Added amount (part) | Flexibility 100% modulus (MPa) | Transparency haze value (%) | Whether a surface exibits bleeding or not | Flexibility 100% modulus (MPa) | Transparency haze value (%) | Whether a surface exibits bleeding or not |
| Example | | | | | | | | | | |
| 13 | 2-ethylhexanol p-hydroxy benzoic acid monoester | 20 | 12-hydroxy Stearic acid triglyceride[*1] | 2.0 | 7.6 | 2.7 | None | 7.7 | 2.9 | None |
| 14 | 2-ethylhexanol p-hydroxy benzoic acid monoester | 20 | Ethylene bis-decanoic acid amide[*2] | 1.5 | 7.7 | 1.4 | None | 7.8 | 1.5 | None |
| 15 | 2-ethylhexanol p-hydroxy benzoic acid monoester | 20 | Ethylene bis-dodecanoic acid amide[*3] | 1.5 | 7.6 | 1.2 | None | 7.6 | 1.3 | None |
| 16 | 2-ethylhexanol p-hydroxy benzoic acid monoester | 20 | Ethylene bis-tetradecanoic acid amide[*4] | 1.5 | 7.7 | 1.0 | None | 7.7 | 1.1 | None |
| 17 | 2-ethylhexanol p-hydroxy benzoic acid monoester | 20 | Ethylene bis-hexadecanoinc acid amide[*5] | 1.5 | 7.6 | 0.8 | None | 7.7 | 0.9 | None |
| 18 | 2-ethylhexanol p-hydroxy benzoic acid monoester | 20 | Methylene bis-octadecanoic acid amide[*6] | 1.5 | 7.6 | 0.7 | None | 7.8 | 0.8 | None |

TABLE 3-continued

| | Plasticizer | Added amount (part) | Anti-blocking agent | Added amount (part) | Before heat treatment | | | After heat treatment (at 60° C. × 1 week) | | |
|---|---|---|---|---|---|---|---|---|---|---|
| | | | | | Flexibility 100% modulus (MPa) | Transparency haze value (%) | Whether a surface exibits bleeding or not | Flexibility 100% modulus (MPa) | Transparency haze value (%) | Whether a surface exibits bleeding or not |
| Comparative example | | | | | | | | | | |
| 5 | 2-ethylhexanol p-hydroxy benzoic acid monoester | 20 | Pentaerythritol tetra-stearate*7 | 2.0 | 7.5 | 41.5 | None | 7.6 | 71.5 | None |
| 6 | 2-ethylhexanol p-hydroxy benzoic acid monoester | 20 | Behenic acid monoglyceride*8 | 3.0 | 7.5 | 20.1 | None | 15.9 | 44.2 | None |

*1 Melting point 86° C., and SP value 9.8
*2 Melting point 165° C., SP value 10.3, and molecular weight 369
*3 Melting point 160° C., SP value 10.0, and molecular weight 425
*4 Melting point 155° C., SP value 9.9, and molecular weight 483
*5 Melting point 149° C., SP value 9.7, and molecular weight 539
*6 Melting point 141° C., SP value 9.6, and molecular weight 579
*7 Melting point 51° C., SP value 8.93, and molecular weight 1163
*8 Melting point 76° C., SP value 10.1, and molecular weight 601

Examples 19 to 30 and Comparative Example 7

A composition including 100 parts of polylactic acid base resin (manufactured by Mitsui Chemicals, Inc., LACEA H-280) dried at 50° C. for 24 hr as a biodegradable resin and a plasticizer and an anti-blocking agent of which kinds and amounts are shown in Tables 3 and 4 was kneaded at 130° C. for 15 minutes with a 6-inch roll, thereafter similarly to Example 1 (with only the roll temperature changed to 130° C.), the lubricity was evaluated. Furthermore, the resin composition was formed into a test piece having a thickness of 0.5 mm by the use of a press molding machine set at 160° C.

The flexibility of the obtained test piece was evaluated according to the following method. In addition, similarly to Example 1, the blocking resistance and the surface state were evaluated. Results are shown in Tables 4 and 5.

<Method of Evaluating Flexibility>

The test piece was punched out with a #3 dumbbell and left for 24 hr in a thermostatic chamber controlled at room temperature of 23° C. and the humidity of 50%. The test piece was subjected to the tension test at the tension rate of 200 mm per minute and the result was shown in terms of 100% modulus.

TABLE 4

| Example | Plasticizer | Added amount (part) | Anti-blocking agent | Added amount (part) | Flexibility 100% modulus (MPa) | Anti-blocking agent | Whether a surface exibits bleeing or not | Lubricity (peel position) |
|---|---|---|---|---|---|---|---|---|
| 19 | 2-ethylhexanol p-hydroxy benzoic acid monoester | 15 | 12-hydroxy stearic acid triglyceride*2 | 1.5 | 13.9 | ○ | None | 4~5 |
| 20 | 2-ethylhexanol p-hydroxy benzoic acid monoester | 20 | 12-hydroxy stearic acid triglyceride*2 | 2.0 | 7.3 | ○ | None | 4~5 |
| 21 | N-n-butyl benzene sulfone amide | 15 | 12-hydroxy stearic acid triglyceride*2 | 1.5 | 12.6 | ○ | None | 4 |
| 22 | PCDL(5650) salicylic acid diester*1 | 25 | 12-hydroxy stearic acid triglyceride*2 | 1.5 | 14.1 | ○ | None | 4 |
| 23 | 2-ethylhexanol p-hydroxy benzoic acid monoester | 25 | Ethylene bis-dodecanoic acid amide*3 | 1.5 | 5.2 | ○ | None | 4~5 |
| 24 | 2-ethylhexanol p-hydroxy benzoic acid monoester | 20 | Ethylene bis hexadodecanoic acid amide*4 | 1.5 | 7.2 | ○ | None | 5 |

TABLE 4-continued

| Example | Plasticizer | Added amount (part) | Anti-blocking agent | Added amount (part) | Flexibility 100% modulus (MPa) | Anti-blocking agent | Whether a surface exibits bleeing or not | Lubricity (peel position) |
|---|---|---|---|---|---|---|---|---|
| 25 | 2-ethylhexanol p-hydroxy benzoic acid monoester | 20 | Ethylene bis stearic acid amide*5 | 1.5 | 7.5 | ○ | None | 5 |

TABLE 5

| | Plasticizer | Added amount (part) | Anti-blocking agent | Added amount (part) | Flexibility 100% modulus (MPa) | Anti-blocking agent | Whether a surface exibits bleeding or not | Lubricity (peel position) |
|---|---|---|---|---|---|---|---|---|
| Example | | | | | | | | |
| 26 | 2-ethylhexanol p-hydroxy benzoic acid monoester | 15 | Hexametylene bis decanoic acid amide*6 | 2.0 | 13.8 | ○ | None | 5 |
| 27 | 2-ethylhexanol p-hydroxy benzoic acid monoester | 20 | Ethylene 12-hydroxy stearic acid amide*7 | 2.0 | 7.6 | ○ | None | 5 |
| 28 | 2-ethylhexanol p-hydroxy benzoic acid monoester | 20 | 12-hydroxy stearic acid amide*8 | 3.0 | 7.4 | ○ | None | 4 |
| 29 | N-n-butyl benzene sulfone amide | 20 | Ethylene bis hexadecanoic acid amide*4 | 1.5 | 7.1 | ○ | None | 4~5 |
| 30 | PCDL(5650) salicylic acid diester*1 | 30 | Ethylene bis hexadecanoic acid amide*4 | 1.5 | 10.0 | ○ | None | 4~5 |
| Comparative example | | | | | | | | |
| 7 | Acetyl tri-n-butyl citric acid (ATBC) | 20 | — | — | 9.0 | X | None | 0 |

*1 Diester of PCDL (5650) (manufactured by Asahi Chemical Industry Co., Ltd., polycarbonate diol that comprises ones having t = 5 and t = 6 in the structural unit (VII) by 50/50 by molar ratio and an average molecular weight of 814) with salicylic acid
*2 Melting point 86° C.
*3 Melting point 160° C. and molecular weight 425
*4 Melting point 149° C. and molecular weight 539
*5 Melting point 144° C. and molecular weight 573
*6 Melting point 143° C. and molecular weight 425
*7 Melting point 142° C. and molecular weight 625
*8 Melting point 96° C. and molecular weight 300

Examples 31 to 39 and Comparative Examples 8 to 10

A composition including 100 parts by weight polylactic acid base resin that is vacuum dried at 50° C. for 24 hr (LACEA H-230 available from Mitsui Chemicals Inc.) and a plasticizer of which kind and amount are shown in Table 6 was kneaded for 15 minutes at 130° C. by the use of a 6-inch roll followed by preparing a 0.5 mm thick test piece at 160° C. by use of a press machine.

The obtained test pieces were evaluated of flexibility, transparency, and its surface state according to the following methods. Furthermore, the test pieces were folded to 180 degrees by hand followed by visually observing whether whitening occurred or not. Results are shown in Table 6.

Furthermore, in order to evaluate the heat resistance of test pieces according to Examples 31 to 35, and 39 and Comparative examples 8 to 10, these test pieces were put in an oven controlled at 50° C., left there for 1 week, and after cooling at room temperature, evaluated similarly of flexibility, transparency and its surface state. These results are also shown in Table 6.

<Method of Evaluating Flexibility>

The test piece was punched out with a #3 dumbbell, left in a thermostatic chamber controlled at 23° C. and 50% RH for 24 hr, and subjected to a tension test at a tension rate of 200 mm/min. The result was shown in terms of 100% modulus.

<Method of Evaluating Transparency>

The haze value of the test piece was measured with a haze meter. When the numeral is smaller, the transparency is more excellent.

<Surface State (Bleeding or Not)>

A test piece (width 100 mm×breadth 100 mm×thickness 0.5 mm) before heat treatment was left in a thermostatic chamber controlled at 40° C. for one week, and thereafter whether the plasticizer bled out or not on a surface thereof was visually observed. Furthermore, one that was heat treated at 50° C. for 1 week, after leaving at room temperature to cool, was visually observed whether the plasticizer bled out or not.

<Method of Evaluating Biodegradability>

According to JIS K6950, the biodegradability test was performed. A coulometer was used to measure and sewage work activated sludge was used as a microbe source. As a test

TABLE 6

|  | Plasticizer*[1] | Added amount (part by weight) | Before heat treatment | | | | After heat treantment (50° C. × 1 week) | | |
|---|---|---|---|---|---|---|---|---|---|
|  |  |  | Flexibility 100% modulus (MPa) | Transparency haze value (%) | Folding whitening | Surface state (bleeding or not) | Flexibility 100% modulus (MPa) | Transparency haze value (%) | Surface state (bleeding or not) |
| Example |  |  |  |  |  |  |  |  |  |
| 31 | 2-ethylhexanol p-hydroxy benzoic acid monoester | 20 | 7.3 | 1.7 | Not found | Not found | 7.4 | 1.9 | Not found |
| 32 | n-octanol p-hydroxy benzoic acid monoester | 20 | 8.0 | 2.3 | Not found | Not found | 8.2 | 2.6 | Not found |
| 33 | POE(2) hexyl ether p-hydroxy benzoic acid monoester | 20 | 7.6 | 2.3 | Not found | Not found | 7.5 | 2.7 | Not found |
| 34 | POE(2)2-ethyl-hexyl ether p-hydroxy benzoic acid monoester | 20 | 8.3 | 2.3 | Not found | Not found | 8.4 | 2.6 | Not found |
| 35 | POE(2) benzyl-ether p-hydroxy-benzoic acid monoester | 20 | 9.1 | 2.4 | Not found | Not found | 9.5 | 2.7 | Not found |
| 36 | POE(8)cyclo-hexane dimethanol salicylic acid diester | 25 | 12.5 | 2.4 | Not found | Not found | — | — | — |
| 37 | POE(16)penta-erythritol salicylic acid tetraester | 30 | 10.8 | 2.8 | Not found | Not found | — | — | — |
| 38 | PCDL(5650) salicylic acid diester*[2] | 30 | 10.2 | 2.0 | Not found | Not found | — | — | — |
| 39 | N-n-butyl-benzene sulfoamide | 15 | 12.5 | 2.2 | Not found | Not found | 12.5 | 2.8 | Not found |
| Comparative example |  |  |  |  |  |  |  |  |  |
| 8 | Nothing added | — | —*[3] | 3.9 | Not found | Not found | — | 4.0 | Not found |
| 9 | Diacetyl lauric acid monoglyceride | 20 | 11.9 | 4.1 | Not found | Found | 17.4 | 18.5 | Found |
| 10 | Dibutyl phthalate (DBP) | 25 | 7.0 | 12.4 | Not found | Found | 16.6 | 44.0 | Found |

*[1]POE (n) denotes an adduct of n moles on the average of polyoxyethylene.
*[2]Diester of PCDL (5650), manufactured by Asahi Chemical Industry Co., Ltd., polycarbonate diol that contains those having n = 5 and n = 6 in the structural unit (I) at the mole ratio of 50/50 and has an average molecular weight of 814, with salicylic acid
*[3]Incapable of measurement owing to breaking at 25% or less elongation Examples 40 to 42

For plasticizers shown in Table 7, the biodegradability of the plasticizer itself was evaluated according to the following method. Results are shown in Table 7.

concentration, a subject to be tested was controlled to 100 mg/L and the activated sludge was controlled to 30 mg/L. Results are shown with a BOD disintegration ratio and a DOC disintegration ratio after 28 days test period.

TABLE 7

| Example | Plasticizer | BOD disintegration degree (%) | DOC disintegration degree (%) |
|---|---|---|---|
| 41 | 2-ethylhexanol p-hydroxybenzoic acid monoester | 81 | 97 |
| 42 | n-octanol p-hydroxybenzoic acid monoester | 86 | 97 |
| 43 | POE(2) hexyl ether p-hydroxybenzoic acid monoester | 90 | 100 |

What is claimed is:

1. A polyester base synthetic resin composition comprising a polylactic acid, a plasticizer and ethylene bis-12-hydroxy stearic acid amide; and wherein the content of the plasticizer is in the range of 3 to 50 parts with respect to 100 parts by weight of polylactic acid and the content of the ethylene bis-12-hydroxy stearic acid amide is in the range of 1.0 to 3 parts by weight.

2. A method of inhibiting a polylactic acid comprising a plasticizer from blocking, comprising adding ethylene bis-12-hydroxy stearic acid amide in the range of 1.0 to 3 parts by weight to 100 parts by weight the polylactic acid.

* * * * *

UNITED STATES PATENT AND TRADEMARK OFFICE
CERTIFICATE OF CORRECTION

PATENT NO. : 7,576,152 B2 Page 1 of 1
APPLICATION NO. : 10/703625
DATED : August 18, 2009
INVENTOR(S) : Akira Takenaka et al.

It is certified that error appears in the above-identified patent and that said Letters Patent is hereby corrected as shown below:

Title Page

In Section [75]:

"Tuchihashi" should read --Tsuchihashi--.

In Section [30]:

"2003-005414" should read --2003-005415--.

Signed and Sealed this

Twenty-second Day of June, 2010

David J. Kappos
*Director of the United States Patent and Trademark Office*